(Model.)

5 Sheets—Sheet 1.

J. O. LEE.
GRAIN BINDER.

No. 279,773. Patented June 19, 1883.

WITNESSES:
Fred. G. Dieterich.
J. G. Hinkel

John O. Lee
INVENTOR.
By Louis Bagger & Co.
ATTORNEYS (Model.)
J. O. LEE.
GRAIN BINDER.
No. 279,773.
5 Sheets—Sheet 2.
Patented June 19, 1883.
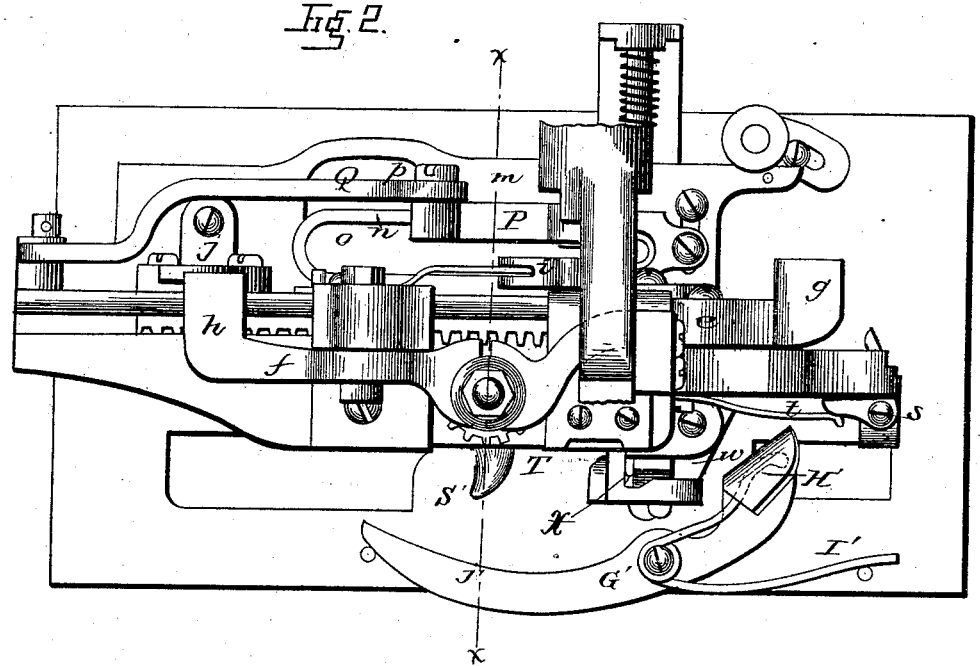
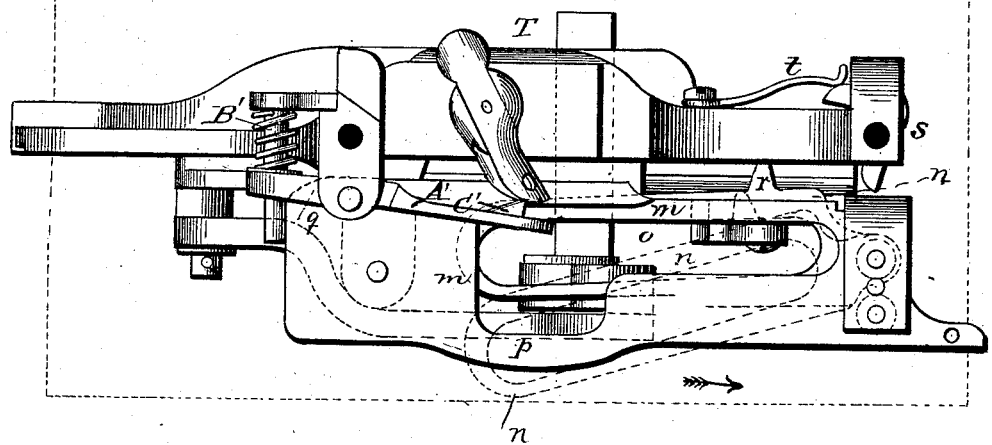
WITNESSES:
Fred. G. Dieterich.
J. G. Hinkel
John O. Lee,
INVENTOR.
By Louis Bagger & Co.
ATTORNEYS

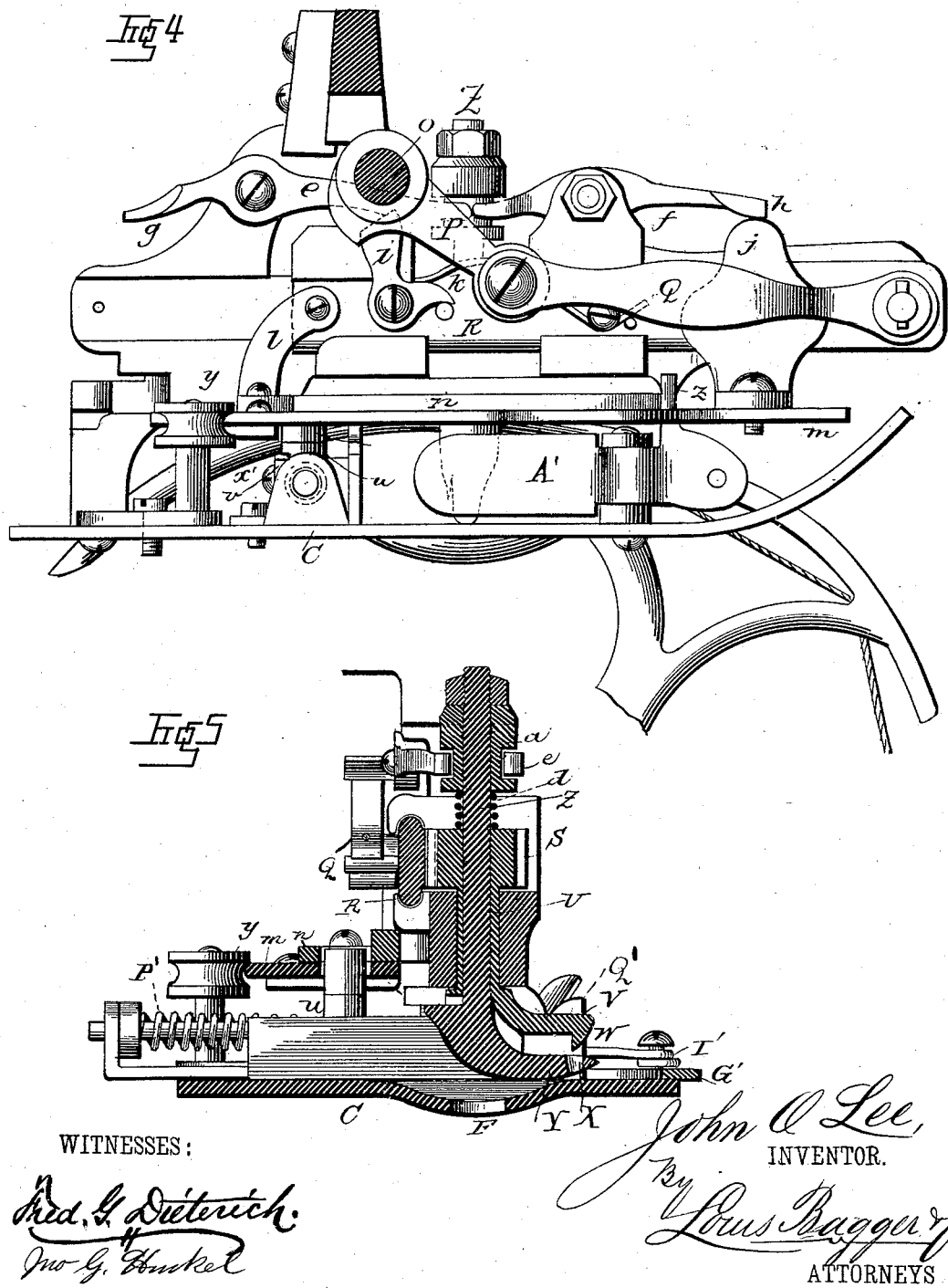

(Model.)
J. O. LEE.
GRAIN BINDER.
No. 279,773. Patented June 19, 1883.
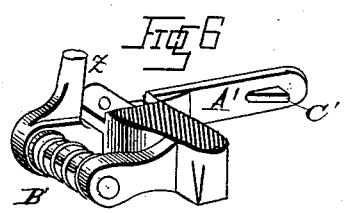
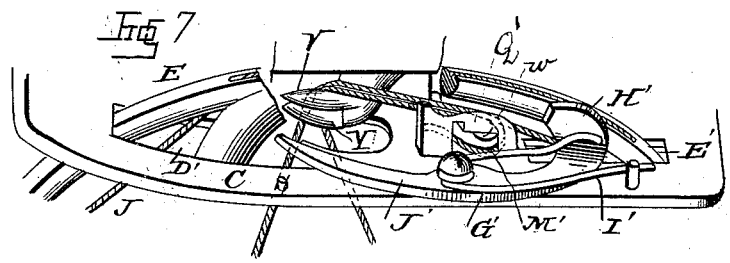
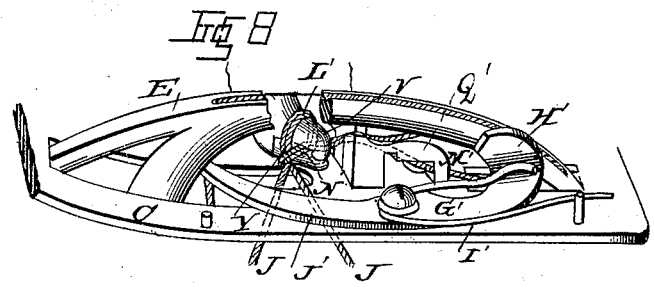
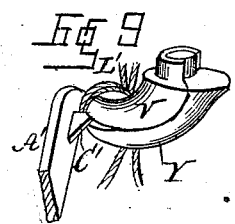
WITNESSES:
Fred G. Dieterich.
Jno. G. Hunkel
John O. Lee,
INVENTOR.
By Louis Bagger & Co.
ATTORNEYS (Model.)

J. O. LEE.
GRAIN BINDER.

No. 279,773.

5 Sheets—Sheet 5.

Patented June 19, 1883.

WITNESSES:
Fred. G. Dieterich
Wm Lecher

John O Lee
INVENTOR
By
Louis Bagger & Co
ATTORNEYS

UNITED STATES PATENT OFFICE.

JOHN O. LEE, OF ST. PAUL, MINNESOTA.

GRAIN-BINDER.

SPECIFICATION forming part of Letters Patent No. 279,773, dated June 19, 1883.

Application filed January 18, 1883. (Model.)

*To all whom it may concern:*

Be it known that I, JOHN O. LEE, of St. Paul, in the county of Ramsey and State of Minnesota, have invented certain new and useful Improvements in Grain-Binders; and I do hereby declare that the following is a full, clear, and exact description of the invention, which will enable others skilled in the art to which it appertains to make and use the same, reference being had to the accompanying drawings, which form a part of this specification, and in which—

Figure 1:
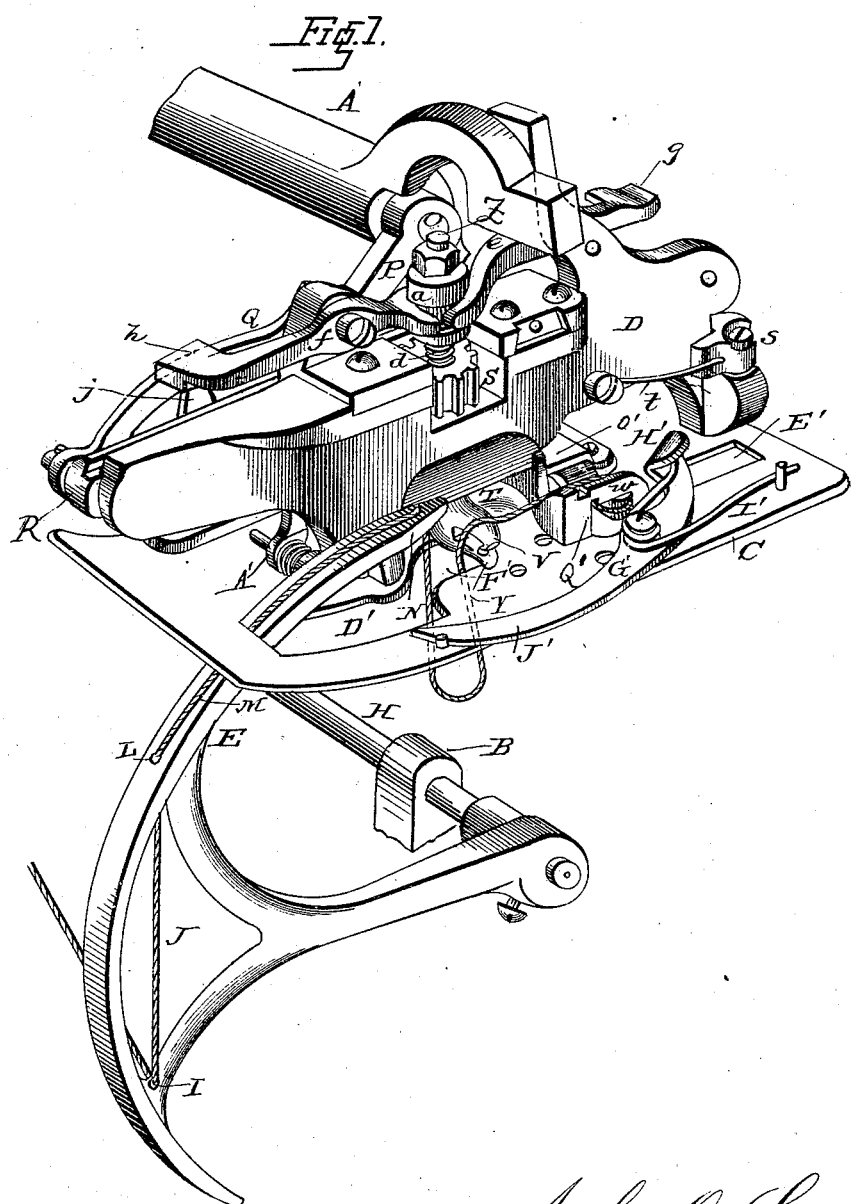
Figure 10:
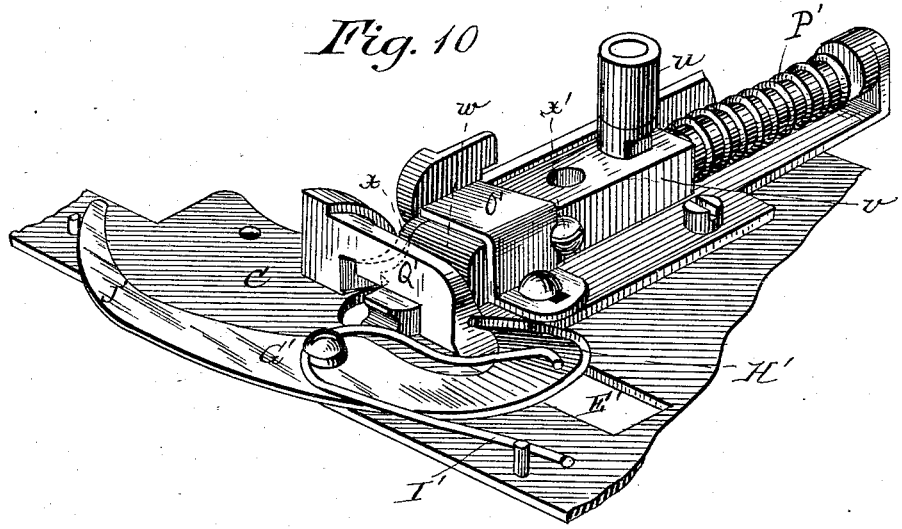
Figure 11:
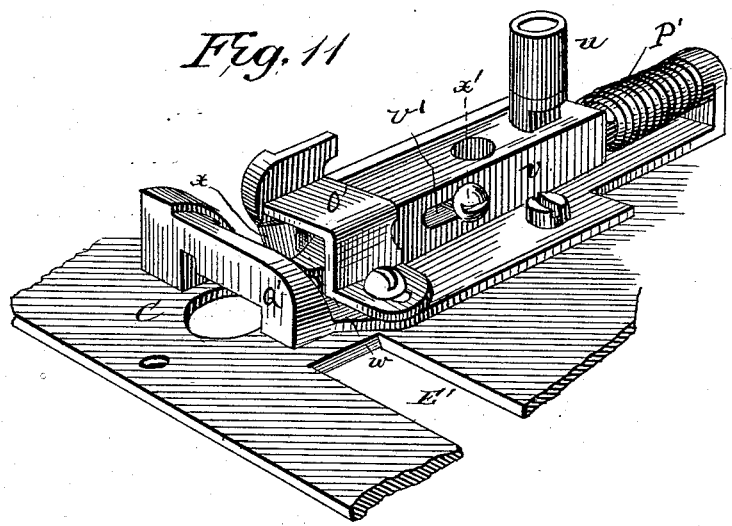

Figure 1 is a perspective view of my improved grain-binder. Fig. 2 is a top view with part of the crane-post broken away. Fig. 3 is a bottom view with the separating-plate removed. Fig. 4 is a rear view, the crane-post and shaft broken away. Fig. 5 is a vertical sectional view on line *x x*, Fig. 2. Fig. 6 is a detail view of the flat lever which strips the loop off the tyer. Figs. 7, 8, and 9 are detail views, showing the different stages of the knot; and Figs. 10 and 11 are perspective detail views of the twine holder and cutter.

Similar letters of reference indicate corresponding parts in all the figures.

My invention has relation to that class of grain-binders which use twine for binding the gavel; and it consists in the improved construction, combinations, and arrangement of parts of the same, as hereinafter more fully described and claimed.

In the accompanying drawings, the letter A indicates an overhanging arm or sleeve, upon which the tying mechanism is fastened, and which serves as bearing for the shaft which operates the tying mechanism. B is the bearings for the needle-shaft, and C is the plate which separates the tying mechanism from the grain-receptacle.

D is a casting fastened to the end of the arm A, and which forms bearings and fastenings for the several parts of the tying mechanism.

E is the ordinary binder-arm or needle, which is reciprocated toward and from the tying devices by a shaft, H, to which it is fastened. The needle has a hole, I, in its lower part for the insertion of the twine J. From this hole the twine is carried up through a hole, L, into a groove, M, in the back of the needle, and passed through the eye N, near its point.

O is the shaft which operates the tying mechanism, and it is rocked by suitable connection with the drive-wheel, as is also the shaft H, both shafts being rocked forward and back once for every knot tied, but at different times. A crank, P, is fastened to the end of the rock-shaft O, and is connected by a pitman, Q, to the rack-bar R, which slides in bearings in the casting D, and engages a pinion, S, upon the tyer T. The tyer consists of a shaft, Z, and an outer sleeve, U, upon the top of which latter the pinion S is fastened, and which turns in a bearing in the casting D. The lower part of this sleeve ends in a curved finger, V, bent at right angles to the sleeve, and provided with a projection, W, which fits into a recess, X, in a finger, Y, of similar shape, which is fastened upon the lower end of the shaft Z, which is connected to the sleeve U, so as to slide up and down in it, but yet be rotated therewith.

The upper part of the shaft Z is provided with a flanged sleeve, *a*, which is rigidly secured thereto in any suitable manner. A spiral spring, *d*, which is placed between the pinion and the sleeve *a*, serves to raise the shaft when it has been depressed.

Two bifurcated levers, *e* and *f*, fulcrumed upon the top of the casting D, project between the flanges upon sleeve *a* and depress it and the shaft when their outer beveled ends, *g* and *h*, which form rearwardly-extending projections, are raised by two cams, *i* and *j*, fastened upon the rack-bar R.

The cam *i* is L-shaped, having the upper arm beveled and the other arm actuated by a spring, *k*, which allows the cam to slide under the beveled end *g* of lever *e* on the back stroke.

A slotted plate, *m*, is fastened to the rack-bar by means of the lower end of cam *j* and an arm, *l*, and this plate *m* has another slotted plate, *n*, pivoted upon it. The slot *o* in plate *m* is widened at one end, forming a recess, *p*, and the plate is beveled or rounded at one corner, *q*. The plate *n* has a projection, *r*, which engages an L-shaped cam, *s*, pivoted upon the end of casting D, turning in a horizontal plane, and having a spring, *t*, bearing against the arm which is not engaged by projection *r*.

A bolt, *v*, slides in a bearing, O', formed upon plate C at the side of the tyer, in a direction transverse to the direction of the needle, and is provided at its rear reduced end with a spiral spring, P', which serves to force it forward when it has been pushed back.

Upon the upper side of this bolt is pivoted vertically a roller, $u$, which projects through the slots in plates $m$ and $n$ and slides in the same. The forward end, $w$, of the bolt $v$ passes through a slotted plate or casting, $Q'$, fastened upon plate C, and bears against one side of the slot, so that if a cord is held in front of the end $w$ when the bolt is retracted it will be caught between the said end and the side of the slot when the bolt springs forward. A plate, $x$, sharpened at its outer end, is adjustably fastened upon the side of bolt $v$ by a set-screw, $x'$, passing through a longitudinal horizontal slot, $v'$, in the bolt, and sliding in the same when loosened, so that the cutter-plate may be moved forward when worn, and the outer sharpened end of the said plate bears against the other side of the slot in plate $Q'$, the said end of the plate and the side of the slot acting as the two blades of a pair of scissors for cutting the cord.

A flat lever, $A'$, is pivoted upon the casting D near the end opposite the holder and cutter, moving in a horizontal plane, and its outer end, against which bears a spiral spring, $B'$, is provided with an upwardly-projecting lug, $z$. As plate $m$ is moved in the direction of the arrow seen in Fig. 3 the rounded end $q$ of the same will press against the said projection or lug $z$, forcing its outer end in toward the casting, compressing the spring, and the side of the plate $m$ will hold the lever in this position until it is moved in the opposite direction and off from the projection upon the end of the lever, which thereupon will resume its former position, allowing a small projection, $C'$, upon that side of the inner end of the lever which faces the tyer to bear into the groove formed between the two fingers V and Y of the latter when it is revolved toward the end of the lever.

The plate C separates the tying mechanism from the binding-receptacle, so as to prevent the straw or grain from impeding the action of the tyer, and has two slots, $D'$ and $E'$, through which the needle may pass when reciprocated, and slot $D'$ has a rounded continuation, $F'$, at its inner end, through which the twine passes from the gavel, and through which the knot slips out when tied.

A curved lever, $G'$, is pivoted upon the upper surface of plate C, and is provided with a beveled head, $H'$, which is forced in position over slot $E'$ by a spring, $I'$, which bears against the said head, while the other end, $J'$, of the lever is curved inward, and serves to guide the twine toward the tyer when the head is forced back by the point of the needle bearing against its beveled side in entering slot $E'$.

The knot is tied in the following manner: Supposing the end of the twine to be held in the holder $w$, and grain sufficient to form a bundle to have been brought into the binding-receptacle and against the cord leading from the holder to the binder-arm, all as usual, the binder-arm will then rise, carrying the twine about the bundle and into position to be grasped by the holder, as seen in Figs. 4 and 7. Near the completion of the upward movement of the needle its point will strike the beveled head H of the lever $G'$ and force the end $J'$ in toward the knotter, so as to carry the cord in position to be gathered in by the knotter as it revolves to form the knot. At this time the tyer and its operating mechanism are in the position shown in Figs. 1 and 4—that is, with the rack-bar to one extreme of what I will call its "forward position," and consequently with the end $h$ of lever $f$ resting upon the cam $j$, so as to have the tyer-fingers open, as seen in Figs. 1 and 5. It may be here remarked that there is no object in having these fingers open at the commencement of the knotting operation; but this position is simply due to the fact that the organization of the mechanism is such that at the termination of each knotting operation the fingers are opened to allow the ends of the cord forming the knot to slip out, and I do not find it necessary to close them until shortly after the knotter starts to form the loop. Now the rack-bar will be moved back from the position above referred to, and, engaging with the pinion on the tyer, will cause it to make one complete revolution, forming the loop about the two fingers, and toward the end of its revolution opening them, so as to catch the two ends to form the complete knot. These movements will be understood from the illustrations in Figs. 7 and 8. Shortly after the rack begins to move, the cam $j$ will pass from under the end $h$ of lever $f$, and the spring $d$ will immediately close the fingers of the knotter, which will revolve in this closed position until near the end of its revolution, when the pivoted cam $i$ on the rack-bar will engage the end $g$ of the lever $e$ and open the fingers to allow the cord to enter between them. The continued movement back of the rack-bar will carry the cam $i$ beyond the end $g$, and the fingers will again be closed by the action of the spring $d$, thus grasping the cord between them. At the same time the projection $r$ upon plate $n$ comes in contact with pawl $s$, and in passing over the projecting arm of the pawl the said projection and plate are forced to the side, the plate swinging upon its pivot and pushing the roller $u$ upon the spring-bolt $v$, which roller projects into the slot in plate $n$ back, whereupon the said bolt, which forms the twine holder and cutter, is forced forward again by its spring when projection $r$ has passed pawl S, holding the new end $M'$ of the twine while the cutter cuts the loops off from the said end. The rack has now reached the limit of its backward movement and immediately begins to move forward. In this movement the cam $l$, by reason of its being pivoted, as before described, will not operate the lever $e$, but the tyer will be given a reverse rotation to strip the loop, allow the knot to be tightened, and then open the fingers to let the ends slip out, and then rest until the knotting operation is to be repeated, all as follows:

As the tyer is revolved back, the curved end $q$ of plate $m$ bears against the projection upon lever A', so as to allow it to bear only lightly against the tyer jaws or fingers, whereby the loop L' is stripped off while the ends of the cord are held by the jaws, the projection W preventing their slipping out until the knot is tightened by the expansion of the gavel, whereupon cam $j$ opens the jaws and allows the gavel to fall with the knot finished.

Having thus described my invention, I claim and desire to secure by Letters Patent of the United States—

1. In a grain-binder, the combination of the tyer T, consisting of sleeve U, having finger V, and shaft Z, having finger Y, flanged sleeve $a$, and spiral spring $d$, with the bifurcated levers $e$ and $f$ and means for operating them, substantially as shown and set forth.

2. In a grain-binder, the combination of the sleeve U, having finger V and pinion S, the shaft Z, having finger Y, flanged sleeve $a$, and spiral spring $d$, bifurcated levers $e$ and $f$, having beveled ends $g$ and $h$, and rack-bar R, having cams $i$ and $j$, substantially as shown and set forth.

3. In a grain-binder, the combination of the tyer T, having jaws or fingers V and Y, the flat lever A', having lateral projection C', and projection $z$ and spring B', and the plate $m$, fastened to the rack-bar and having rounded or beveled corner $q$, substantially as shown and set forth.

4. In a grain-binder, the combination of the spring-bolt $v$, having twine holder and cutter $w$ and $x$ and roller $u$, slotted plate $n$, pivoted upon plate $m$, and having projection $r$, and pivoted L-shaped cam $s$, substantially as and for the purpose shown and set forth.

5. In a grain-binder, the combination of the plate $m$, fastened to the rack-bar, and having longitudinal slot $o$, enlarged at one end at $p$, slotted plate $n$, pivoted to the plate $m$, and having projection $r$, pivoted cam $s$, and spring-bolt $v$, having roller $u$, substantially as set forth.

6. The herein-described grain-binder, consisting of shaft H, binder-arm E, shaft O, having crank P, pitman Q, rack-bar R, tyer T, bifurcated levers $e$ and $f$, slotted plate $m$, slotted pivoted plate $n$, having projection $r$, pivoted cam $s$, spring-bolt $v$, having roller $u$ and twine holder and cutter, flat lever A', and curved lever G, having beveled head H, all constructed and combined to operate substantially as shown and set forth.

In testimony that I claim the foregoing as my own I have hereunto affixed my signature in presence of two witnesses.

JOHN O. LEE.

Witnesses:
 J. P. ALLEN,
 HARRISON ALLEN.